Jan. 16, 1934.  W. R. HEWITT  1,943,672

LOCK NUT

Filed May 22, 1933

INVENTOR.
William R. Hewitt.
BY Townsend & Loftus.
ATTORNEYS.

Patented Jan. 16, 1934

1,943,672

UNITED STATES PATENT OFFICE 1,943,672

LOCK NUT

William R. Hewitt, New York, N. Y.

Application May 22, 1933. Serial No. 672,249

4 Claims. (Cl. 151—15)

This invention relates to lock nuts of the type disclosed in my co-pending application entitled "Lock nut," filed June 22, 1931, Serial Number 546,114; and this application is a continuation in part of my said co-pending application.

The object of the present invention is to generally improve and simplify the construction and operation of lock nuts of the character described; to provide a lock nut comprising a pair of nuts which are longitudinally connected; to provide a connection between the nuts whereby they are automatically interlocked when assembled and thereafter permanently retained against separation; to provide a connection between the nuts which permits a relative limited rotation of one nut with relation to the other; and, further, to provide an interlocking connection between the nuts which is substantial and sufficiently rugged to withstand the abuse and strains often applied.

One form which the nut may assume is shown by way of illustration in the accompanying drawing, in which—

Figure 1:
Fig. 1 is a central, vertical section of the lock nut.
Figure 2:
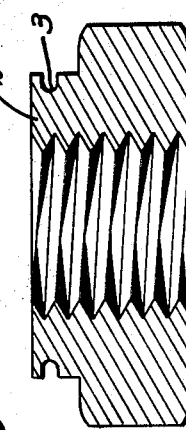
Fig. 2 is a central, vertical section of the main or holding nut.
Figure 3:
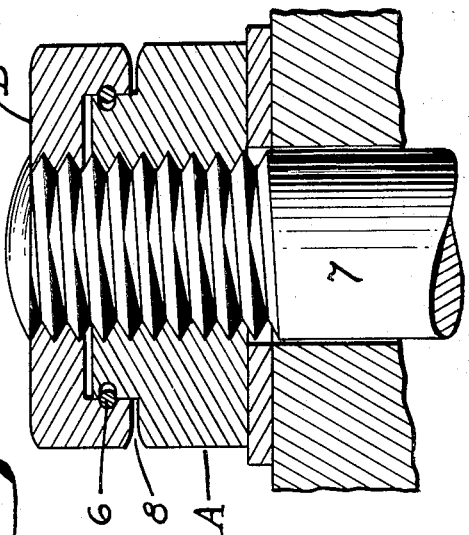
Fig. 3 is a central, vertical section showing the nuts assembled and applied to a bolt.
Figure 4:
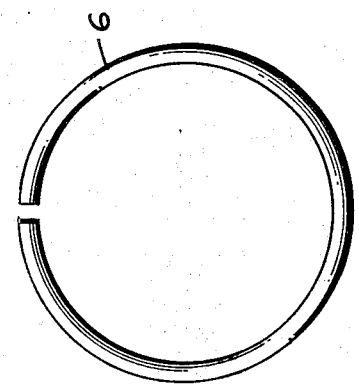
Fig. 4 is a plan view of the radially expansible spring whereby the nuts are interlocked.

Referring to the drawing in detail and particularly Figs. 1 to 3, inclusive, A indicates a main or holding nut and B a jam or lock nut. Formed on one end of the holding nut A is a cylindrical projection 2, and formed on the exterior surface thereof is an annular groove 3. Formed on the adjacent surface of the jam nut is an annular extension 4, the inner surface of which is cylindrical and formed in said cylindrical surface is an annular groove 5. The grooves align or assume a common plane when the nuts are assembled as shown in Fig. 3, and they form a housing and retainer for a radially expansible spring ring 6 (see Figs. 3 and 4).

Figure 5:
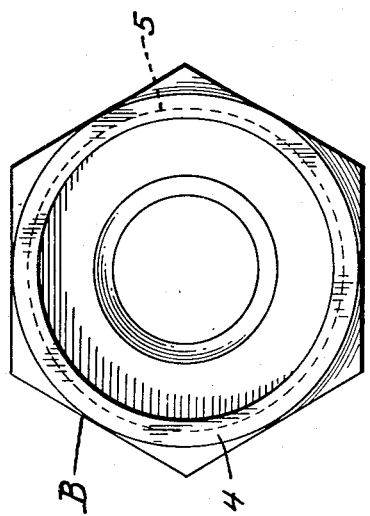
Fig. 5 is a plan view of the nuts when assembled but before the lock nut has been tightened.

In actual practice the nuts are formed as shown in Figs. 1 and 2, and when it is desired to assemble them, the spring ring 6 is placed in a groove 3 and contracted. The nut B is then placed over the extension 2 and moved downwardly and the moment the grooves 3 and 5 align the ring 6 will expand into the groove 5, this groove being so shallow as to prevent the ring from expanding completely out of the groove 3 so that an interlock is formed between the nuts which prevents endwise separation of the same. A limited rotational movement of one nut with relation to the other is, however, permitted, and this movement is utilized to lock the jam nut. The exterior surfaces of the nuts should be identical. They may be square, or otherwise shaped, or hexagonal as shown. The surfaces align as shown in Fig. 5.

When the nuts are assembled as above described and the grooves 3 and 5 are aligned for the reception of the ring 6, there is a narrow space between the extension 4 on the nut B and the nut A, as illustrated at 8 in Fig. 3. This space is exaggerated in the drawing as it is of just sufficient width to permit partial rotation of the nut B relative to the nut A after they are assembled as shown in Fig. 3.

Figure 6:
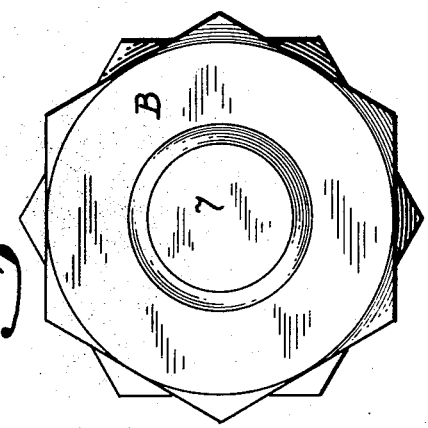
Fig. 6 is a similar view showing the lock nut in tightened position.

When the two nuts are being applied to a bolt, such as shown at 7 in Fig. 3, and when the nuts have been tightened, the jam nut is given a slight turn and it will then assume the position shown in Fig. 6; this movement being sufficient to bite the threads and thereby frictionally jam or secure the nuts against removal. This slight turning of the jam nut first causes the same to advance toward the nut A, taking up the space indicated at 8. With this movement the grooves 3 and 5 are moved out of alignment sufficiently to cause their edges to bite into the ring 6, thus frictionally retaining the two nuts against relative turning or loosening movement. When the space 8 is taken up so that the two nuts abut each other further attempt at rotation of one nut relative to the other causes a biting or heavy frictional contact of the threads of the nuts against those of the bolt.

A nut lock constructed in the manner described provides a permanent connection between the main nut and the lock nut. They are always assembled and one can not be lost with relation to the other. The nut is applied in a manner similar to an ordinary lock nut and it is jammed into position by slight relative rotation of the lock nut. The method of construction permits both nuts to be tapped or threaded at the same time so that there is a proper sequence in the thread, thus insuring a certain lock when the lock nut is turned up to its limit.

In assembling the nuts the interlock between the same is automatically effected the moment the spring ring is inserted and the nuts assembled, and when once locked by the ring the nuts are, practically speaking, inseparable. Furthermore, by externally and internally grooving the nuts and interlocking them by the spring ring shown a substantial rugged connection is formed which will stand the abuse and strain to which nuts of this character are subjected, and due to the double locking feature, including frictional bearing upon the locking ring as well as the frictional contact between the threads of the nuts and the thread of the bolt, loosening of the nuts on the bolt is made practically impossible.

While certain features of the present invention are more or less specifically described, I wish it understood that various changes may be resorted to within the scope of the appended claims; and similarly that the materials and finish of the several parts employed may be such as the manufacturer may decide, or varying conditions or uses may demand.

Having thus described my invention, what I claim and desire to secure by Letters Patent is—

1. A nut lock comprising a pair of abutting nuts, telescoping members formed partially in abutting ends of the nuts, one of said telescoping members having an annular groove formed in its exterior surface and the other member having an annular groove formed in its inner surface, said grooves being equal in width at their open portions and being adapted to register when the nuts are assembled with a slight space between their abutting surfaces, and a radially expansible ring disposed in said grooves and securing the nuts against endwise separation.

2. A nut of the character described comprising a holding nut and a lock nut, said nuts being adapted to abut each other endwise, an annular extension on the lock nut and having an interior cylindrical surface in which is formed an annular groove, a cylindrical extension on the holding nut extending into the cylindrical member formed in the lock nut, the extension on the holding nut having an annular groove equal in width to said first-named groove formed in its exterior surface, said groove being adapted to register with the groove in the lock nut when the abutting surfaces of the nuts are slightly spaced from each other, and a radially expansible spring ring housed by said grooves and securing the nuts against endwise separation but permitting limited turning movement of one nut with relation to the other.

3. A device of the character described which comprises a nut and a lock nut each having the usual threaded bore, an extension on the nut concentric to its bore and smaller than the nut whereby a shoulder is presented, an extension on the lock nut concentric to its bore and fitted to telescope over the extension on the nut and abut the said shoulder when the nut and lock nut are screwed on a bolt, each of said extensions having a groove formed in their adjacent faces and adapted to align with each other just before the extension on the lock nut abuts said shoulder, and a spring ring of substantially the same thickness as said grooves fitted in the space provided by said grooves, whereby turning of the lock nut relative to the nut will cause the edges of said grooves to bite into said ring and frictionally retain the nut against turning movement on the bolt.

4. A device of the character described which comprises a nut and a lock nut each having the usual threaded bore, an extension on the nut concentric to its bore and smaller than the nut whereby a shoulder is presented, an extension on the lock nut concentric to its bore and fitted to telescope over the extension on the nut and abut the said shoulder when the nut and lock nut are screwed on a bolt, each of said extensions having a groove formed in their adjacent faces and adapted to align with each other just before the extension on the lock nut abuts said shoulder, and a spring ring fitted in the space provided by said grooves, the cross section of said ring being of substantially the same thickness as the width of both of the grooves, whereby turning of the lock nut relative to the nut will cause distortion of the bolt threads due to abutment between the nut and lock and also cause the edges of said grooves to bite into the spring ring and frictionally resist turning movement of the nut and lock nut on the bolt.

WILLIAM R. HEWITT.